July 31, 1945. C. E. FITCH 2,380,510
SERVO UNIT
Filed Oct. 12, 1942 2 Sheets-Sheet 1
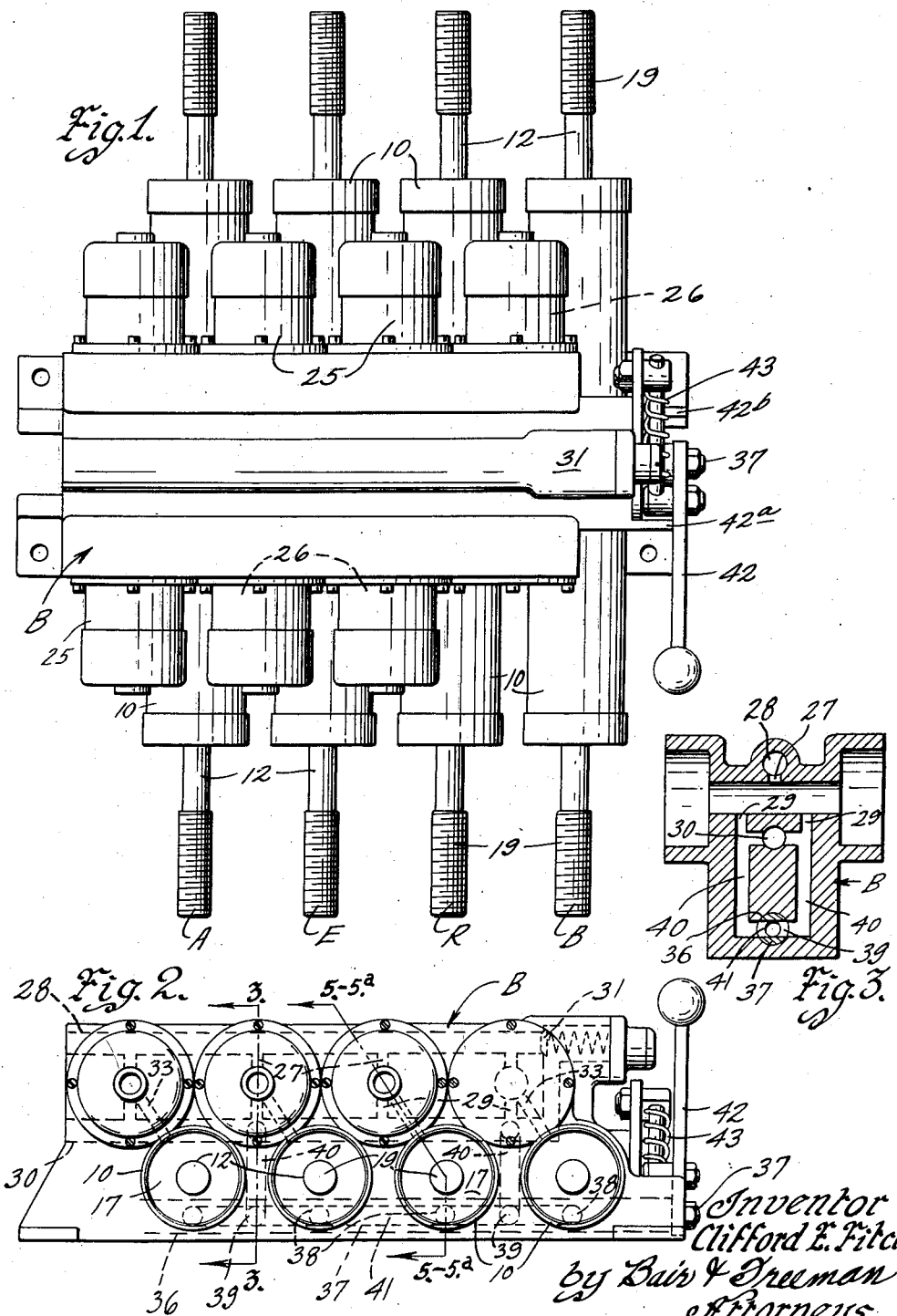

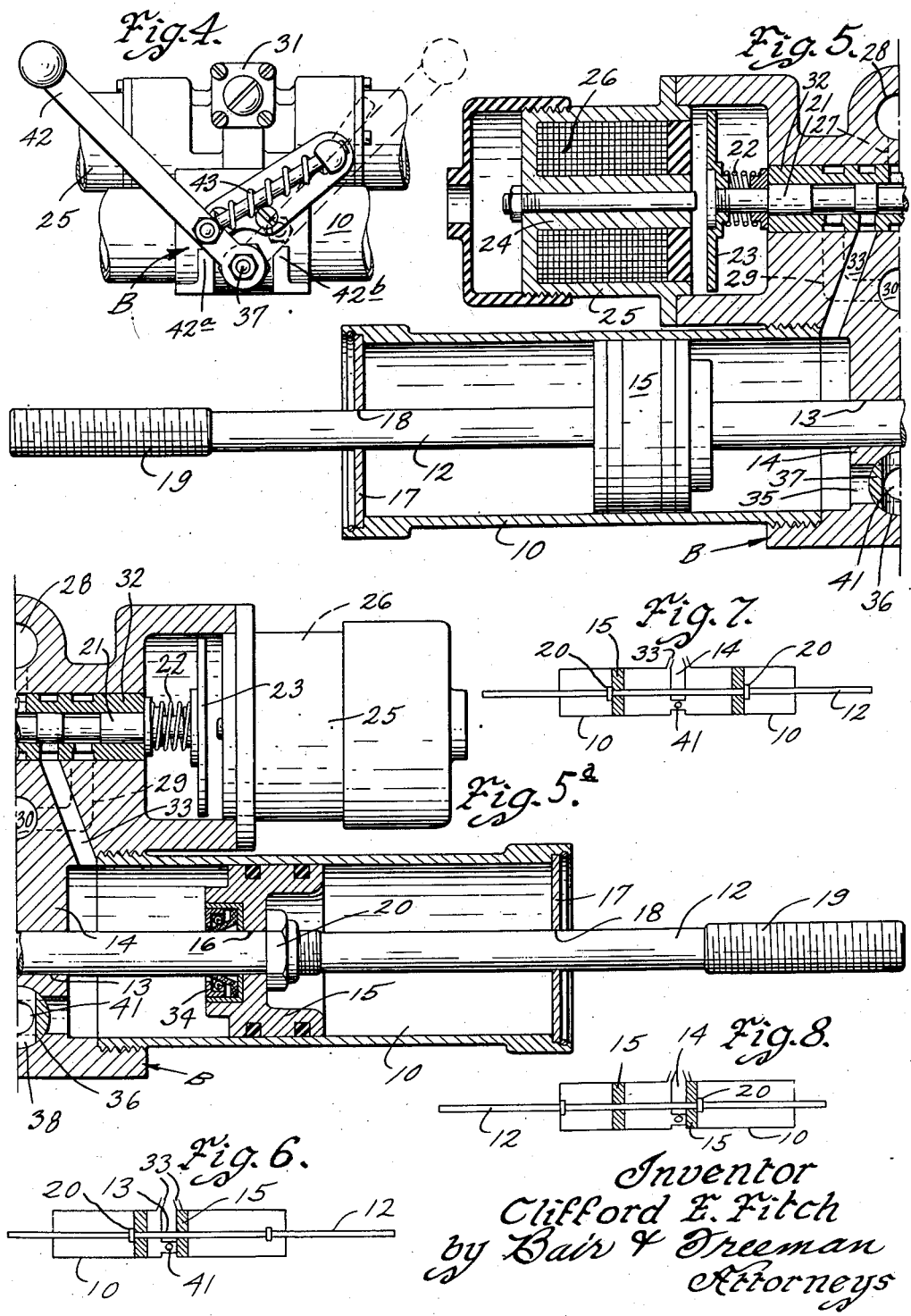

Patented July 31, 1945

2,380,510

UNITED STATES PATENT OFFICE 2,380,510

SERVO UNIT

Clifford E. Fitch, Bryan, Ohio, assignor to The Aro Equipment Corporation, Bryan, Ohio, a corporation of Ohio Application October 12, 1942, Serial No. 461,818

11 Claims. (Cl. 121—38)

My present invention relates to a servo unit of the hydraulic type for operating control devices from a remote point, it being particularly designed for operating the control surfaces of an airplane by radio.

The main object of my invention is to provide a servo unit equipped with a manually operable valve effective to change from automatic control, such as radio control, to manual control in such a manner that the control surfaces of the airplane may then be manually manipulated without drag thereon, as presented by the hydraulic actuating means of the servo unit.

Another object is to provide a piston and control rod arrangement which, upon the servo unit being set for manual operation, permits initial manual movement of the control rod to move the piston to an out-of-the-way position, the control rod thereafter being freely movable with respect to the piston so that drag on the manual control is minimized.

Another object is to provide a valve arrangement which may be manually set for either automatic control or manual control of the control surfaces of an airplane or the like, the valve, when in position for permitting manual operation thereof, opening communication between the cylinders of the servo unit and between a fluid pressure discharge port and the cylinders, thereby permitting oil to be readily forced out of the control cylinders upon movement of the pistons therein by manual movement of the control rod.

Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings forming a part of this specification and throughout the views of which like reference characters refer to the same parts.

In the drawings:

Figure 1 is a plan view of a servo unit including my invention;

Figure 2 is an end elevation thereof;

Figure 3 is a sectional view on the line 3—3 of Figure 2;

Figure 4 is an end elevation of the right-hand end of Figure 2;

Figure 5 is an enlarged sectional view on the line 5—5 of Figure 2, showing only half of the unit;

Figure 5ᵃ is a similar sectional view on the line 5ᵃ—5ᵃ of Figure 2, showing the other half of the servo unit, Figure 5ᵃ being an extension of the right-hand side of Figure 5; and Figures 6, 7 and 8 are diagrammatic views showing operating characteristics of my invention.

On the accompanying drawings I have used the reference character B to indicate a central body portion of a servo unit. Cylinders 10 are screwed into the body B and are arranged in opposed pairs, as illustrated. A control rod 12 extends through each pair of cylinders, and these rods may be attached to any desired type of device to be controlled. In connection with an airplane, for instance, they may be connected to the aileron, elevators, rudder and brakes, as indicated by the reference characters A, E, R and B, respectively, in Figure 1.

Each control rod 12 extends slidably through a bore 13 of a partition member 14 between the two cylinders 10. In each cylinder is a piston 15, and each rod extends slidably through bores 16 of its pair of pistons. The outer end of each cylinder has an end plate 17 provided with a central opening 18 through which the rods 10 slidably extend. The rods terminate in threaded portions 19 which may be connected to control cables or the like for moving the control surfaces and brake levers of an airplane. Since these parts and the connections to them form no part of my present invention, they have not been illustrated on the drawings.

Each rod 12 has a stop shoulder thereon in the form of a nut 20. The nut 20 is screwed tightly enough on the rod to prevent any subsequent loosening thereof during operation.

For each pair of cylinders 10 a slide valve 21 is provided, and each valve is normally retained in a centered position by springs 22 on the opposite ends thereof, as shown in Figures 5 and 5ᵃ. The ends of the valves terminate in armature plates 23 which are adapted to be attracted by solenoid cores 24 and their casings 25 when solenoids 26 on the cores and in the casings are energized in an obvious manner. Accordingly, when the solenoid in Figure 5 is energized, the valve 21 will shift to the left, and when the solenoid of Figure 5ᵃ is energized it will shift to the right, deenergization of both solenoids permitting the valve to remain in its central position shown.

The valves 21 are connected by ports 27 with a pressure fluid supply passageway 28 and by ports 29, with a pressure fluid discharge passageway 30. The passageway 28 is connected with the output of a hydraulic pump, in the usual manner, and the passageway 30 is connected with the reservoir therefor, the usual pressure relief valve 31 (see Figure 2) being provided to maintain a predetermined pressure in the fluid pressure supply passageway 28.

Each valve 21 slides in a sleeve 32 suitably ported and provided with annular grooves so that the proper grooves coact with the ports 27 and 29, and with ports 33, the latter being in communication with the interiors of the cylinders 10. Briefly, although it forms no part of my present invention, this arrangement permits the cylinder of Figure 5 to be connected with the supply passageway 28 when the solenoid of Figure 5 is energized, and, at the same time, the cylinder of Figure 5ᵃ is connected with the return passageway 30. When the solenoid of Figure 5ᵃ is energized instead of the solenoid of Figure 5, then pressure fluid is supplied to the cylinder of Figure 5ᵃ, and may return from the cylinder of Figure 5.

My invention has to do with the arrangement of the control rod 12 with its stop shoulders 20 and the rod being slidable through the pistons 15. A suitable seal is provided at 34 for sealing each piston relative to its rod. Since the rod is moved to the left only when oil is introduced into the cylinder of Figure 5, and to the right only when introduced into the cylinder of Figure 5ᵃ, a one-way connection is all that is necessary between the control rod and the piston, these connections being oppositely arranged with respect to the two pistons on one rod. This one-way connection is an important feature, as will hereinafter appear in the description.

The servo units of the type illustrated are adapted for energization of the solenoid coils 26 by means of relays which, in turn, are operated by a radio receiving set responding to a radio transmitter. Accordingly, the various control surfaces of the plane may be selectively moved in one direction or the other, as desired. Likewise, the brakes may be energized or de-energized, as desired. Since the brakes usually have return springs, it is necessary to provide only one solenoid for controlling them, as illustrated in Figure 1.

Radio controlled planes, however, are usually of the type which can be operated by pilots under certain circumstances. It is accordingly desirable to have some means to free the control rods 12 with relation to their pistons 15, so that the pistons do not create a drag on manually operable controls, and this I accomplish by the mechanism which will now be described.

The partition 14 has a passageway 35 therethrough for each pair of cylinders 10. Intersecting this passageway is a bore 36 extending substantially the full length of the body B. In this bore is a rotatable rod 37 constituting a valve. The rod 37 is provided with a cross-port 38 at each passageway 35.

As shown in Figure 3, and by dotted lines in Figure 2, the valve rod 37 has two cross-ports 39, which communicate through passageways 40 with the return passageway 30. The valve rod 37 has a longitudinal bore 41 affording communication between the cross-ports 38 and the cross-ports 39.

For rotating the valve rod 37 a quarter turn from manual position, shown in Figure 3, to operating position, shown in Figures 5 and 5ᵃ, I provide a control handle 42 on the outer end of the valve at one end of the body B. This valve has an over-center spring 43 for holding it in either the full-line position of Figure 4 or the dotted line position thereof. Stop flanges 42ᵃ and 42ᵇ are provided for the lever 42 in these two positions. Thus the valve may be set for either manual or automatic operation, as desired.

When the valve 37 is set for automatic operation, as in Figures 5 and 5ᵃ, then operation of the pistons 15 is dependent upon the solenoids 26, as already described. When, however, the valve is set for manual operation, as in Figure 3 (corresponding to the dotted line positions of the ports 38 in Figures 5 and 5ᵃ) communication is opened between opposite cylinders of each pair of cylinders through the passageways 35 and from the cylinders through the passageway 41 to the passageways 40, and thereby to the return passageway 30. The control rods 12 may now be operated manually, with assurance that there will be a minimum of drag on them. To illustrate what takes place, Figure 7 shows the parts diagrammatically in the positions of Figures 5 and 5ᵃ, except that the valve 37 is open. It is accordingly obvious that movement of the control rod to the left, as to its limit of movement shown in Figure 8, will carry the right-hand piston 15 with it, the piston finally taking up a position adjacent the partition 14. The left-hand piston, however, creates a minimum of drag, because it is not moved along with the control rod, but the oil displaced by the right-hand piston 15 passes longitudinally through the passageway 41 and is then discharged from the port 39 into the passageways 40, finding its way back to the reservoir through the return passageway 30.

The control rod 12 may now be moved toward the right from the Figure 8 position without moving either of the pistons until the left-hand stop nut 20 engages the left-hand piston and then moves it, as to the position of Figure 6. When this piston is moved all the way to its limit of movement, thereafter the control rod may move in either direction without moving the pistons and requiring, therefore, the displacement of oil manually by manual movement of the control rod.

From the description of my invention and of its operation it is obvious that I have provided a means to manually set a servo unit for manual operation, after which initial movement of the control rod necessitates movement of only one of its two pistons when moving in one direction, and movement of only its other piston when moving in the opposite direction, this initial movement eventually positioning the pistons where they no longer need move at all when the control rod is moved. This is particularly desirable where a plane is on radio control between stations, and is taken off and landed by the pilot. Just before he lands he can throw the lever 42 to manual control position and manually operate the control surfaces. While high in the air these may be moved considerable distances so as to get the pistons 15 relatively close to the partition 14, thus freeing all of the control rods for the landing operation. This is especially essential when the landing speed approaches the stalling speed of the plane, and the control surfaces accordingly are at a minimum of sensitivity. At this time, the freer the control rods operate, the better, so as to give the pilot the proper "feel" of his ship at the time of contact with the ground.

Having described one specific embodiment of my invention together with the operation thereof, I desire it to be understood that this form is selected merely for the purpose of facilitating disclosure of the invention rather than for the purpose of limiting the number of forms which it may assume. It is to be further understood that various modifications, adaptations and alterations may be applied to the specific form disclosed to meet the requirements of practice without in any manner departing from the spirit and scope of the present invention except as set forth in the claims appended hereto.

I claim as my invention:

1. In a servo unit of the character described, a pair of cylinders arranged end to end, a partition between said cylinders, a control rod extending through said cylinders and partition, a piston in each cylinder, means to introduce pressure fluid on one side of said partition to one of said cylinders to move the piston therein and thereby cause said control rod to travel in one direction and to introduce pressure fluid on the other side of said partition to the other cylinder to move the piston therein and thereby cause said control rod to travel in the opposite direction, said control rod being slidable through said pistons and having stop shoulders thereon outside of said pistons whereby movement of one of said pistons moves said control rod in one direction and movement of the other piston moves it in an opposite direction, and means to free said control rod with respect to said pistons when manual movement of said control rod is desired comprising a manually operated valve for effecting communication through said partition between one cylinder and the other cylinder and between said cylinders and with a pressure fluid discharge port.

2. In a servo unit, a pair of cylinders, a partition therebetween, a control rod extending through said cylinders and partition, a piston in each cylinder, means to introduce pressure fluid on one side of said partition to one of said cylinders to move the piston therein and thereby cause said control rod to travel in one direction and to introduce pressure fluid on the other side of said partition to the other cylinder to move the piston therein and thereby cause said control rod to travel in the opposite direction, said control rod being slidable through said pistons and said partition, and having a stop shoulder on the outer side of one piston and a second stop shoulder on the opposite and outer side of said other piston.

3. In a servo unit, a pair of cylinders, a partition between said cylinders, a control rod extending through said cylinders and partition, a piston in each cylinder, means to introduce pressure fluid to one of said cylinders to move the piston therein and thereby cause said control rod to travel in one direction and to introduce pressure fluid to the other cylinder to move the piston therein and thereby cause said control rod to travel in the opposite direction, said control rod being slidable through said pistons and having a stop shoulder on one side of the outer piston and a second stop shoulder on the opposite side of said other piston, and means to free said control rod with respect to said pistons comprising a valve for effecting communication through said partition between said cylinders and with a pressure fluid discharge port.

4. In a servo unit, a pair of cylinders, a control rod extending through said cylinders, a partition between said cylinders, said control rod extending therethrough, a piston in each cylinder, a pressure fluid supply passageway, a pressure fluid discharge passageway, a control valve for controlling the flow of pressure fluid from said pressure fluid supply passageway to said cylinders and from said cylinders to said pressure fluid discharge passageway to thereby cause said control rod to travel in one direction or the other, said control rod being freely slidable through said pistons and provided with a stop shoulder on the outer side of one piston and a second stop shoulder on the outer side of the other piston, and means to free said control rod with respect to said pistons comprising a valve for effecting communication through said partition cylinders and to said pressure fluid discharge passageway.

5. In a hydraulic control device of the character disclosed, a pair of cylinders normally isolated from each other, a piston in each cylinder, a control rod extending from one cylinder into the other cylinder and slidable through said pistons, a limiting shoulder on said control rod on the outer side of one piston and a second limiting shoulder on said control rod on the outer side of the other piston, pressure fluid supply and discharge means for moving one of said pistons or the other to thereby move said control rod in one direction or the other, a control valve for the pressure fluid supply and discharge means, and an auxiliary valve to by-pass the fluid pressure with respect to said isolating means from one cylinder to the other and for opening communication between said cylinders and said pressure fluid discharge means independent of said control valve.

6. In a hydraulic control device of the character disclosed, a pair of cylinders, a partition between said cylinders, a piston in each cylinder, a control rod extending from one cylinder, through said partition and into the other cylinder, and slidable through said pistons, a limiting shoulder on said control rod on the outer side of one piston and a second limiting shoulder on said control rod on the outer side of the other piston, pressure fluid supply and discharge means for moving one of said pistons or the other to thereby move said control rod in one direction or the other, and a control valve for the pressure fluid supply and discharge means, and an auxiliary valve for opening communication through said partition between said cylinders and with said pressure fluid discharge means independent of said control valve.

7. In a hydraulic control structure, a pair of cylinders arranged end to end with a partition between them, a control rod extending from one cylinder into the other, a piston in each cylinder slidable on said control rod, said control rod having a shoulder in each cylinder on opposite sides of said pistons whereby movement of one piston in one direction moves said control rod in a corresponding direction and movement of the other piston in the opposite direction moves said control rod in a correspondingly opposite direction, a pressure fluid supply passageway, a fluid pressure discharge passageway, a valve for controlling flow of pressure fluid from said first passageway to said cylinders and from said cylinders to said second passageway, an opening through said partition from one cylinder to the other, a normally closed valve in said opening, said last valve, when open, affording communication between said cylinders and having a passageway for connecting both cylinders with said pressure fluid discharge passageway.

8. In a control structure, a pair of cylinders, a partition separating said cylinders, a control rod extending through said partition from one cylinder into the other, a piston in each cylinder slidable on said control rod, said control rod having a shoulder in each cylinder on the outer sides of said pistons whereby movement of one piston in one direction moves said control rod in a corresponding direction and movement of the other piston in the opposite direction moves said control rod in a correspondingly opposite direction, a pressure fluid supply passageway, a pressure fluid discharge passageway, a valve for controlling flow of pressure fluid from said first passageway to said cylinders and from said cylinders to said second passageway, and a normally closed valve in said partition, said last valve, when open, affording communication between said cylinders and said pressure fluid discharge passageway.

9. In a hydraulic control structure, a pair of cylinders isolated from each other, a control rod through said cylinders, a pressure fluid operated device in each cylinder for moving said control rod in one direction when one of said pressure fluid operated devices is rendered active and for moving said control rod in an opposite direction when the other of said pressure fluid operated devices is rendered active, said control rod having one-way connections with said pressure fluid operated devices which permit one piston to remain stationary while the control rod is moved in one direction and permit the other piston to remain stationary while the control rod is moved in the opposite direction, and a normally closed valve which, when open, affords communication between said cylinders and with a pressure fluid discharge passageway.

10. In a hydraulic control structure of the character disclosed, a pair of hydraulically operated devices independent of each other, a control rod, a limiting shoulder on said control rod at the outer side of one of said devices and a second limiting shoulder on said control rod at the outer side of the other of said devices, pressure fluid supply and discharge means for actuating one of said devices or the other to thereby move said control rod in one direction or the other, a cylinder for each of said hydraulically operated devices, said cylinders being isolated from each other, a control valve for the pressure fluid supply and discharge means, and a manually operated valve for opening communication between said cylinders and with said pressure fluid discharge means independent of said control valve.

11. In a hydraulic control structure of the character disclosed, a pair of hydraulically operated devices independent of each other, a control rod having a stop shoulder for each device, pressure fluid supply and discharge means for actuating one of said devices or the other to thereby move it to engage its respective stop shoulder to move said control rod in one direction or the other, a control valve for the pressure fluid supply and discharge means, and a manually operated valve for opening communication between said independent devices and with said pressure fluid discharge means independent of said control valve to permit manual actuation of said control rod independently of either of said devices after moving the rod in a direction for engaging the stop shoulders with the devices and thereby moving them to positions beyond the normal range of said control rod.

CLIFFORD E. FITCH.